June 4, 1957 G. B. WORTHEN 2,794,850

COMPENSATED PHOTOTUBE AMPLIFIER

Filed Feb. 28, 1951 2 Sheets-Sheet 1

INVENTOR
G. B. WORTHEN

BY [signature]
ATTORNEY

June 4, 1957 G. B. WORTHEN 2,794,850

COMPENSATED PHOTOTUBE AMPLIFIER

Filed Feb. 28, 1951 2 Sheets-Sheet 2

*INVENTOR*
G. B. WORTHEN

*BY* M. J. Reynolds

ATTORNEY 2,794,850

COMPENSATED PHOTOTUBE AMPLIFIER

George B. Worthen, New York, N. Y., assignor to The Western Union Telegraph Company, New York, N. Y., a corporation of New York Application February 28, 1951, Serial No. 213,135

9 Claims. (Cl. 178—7.1)

Figure 1:
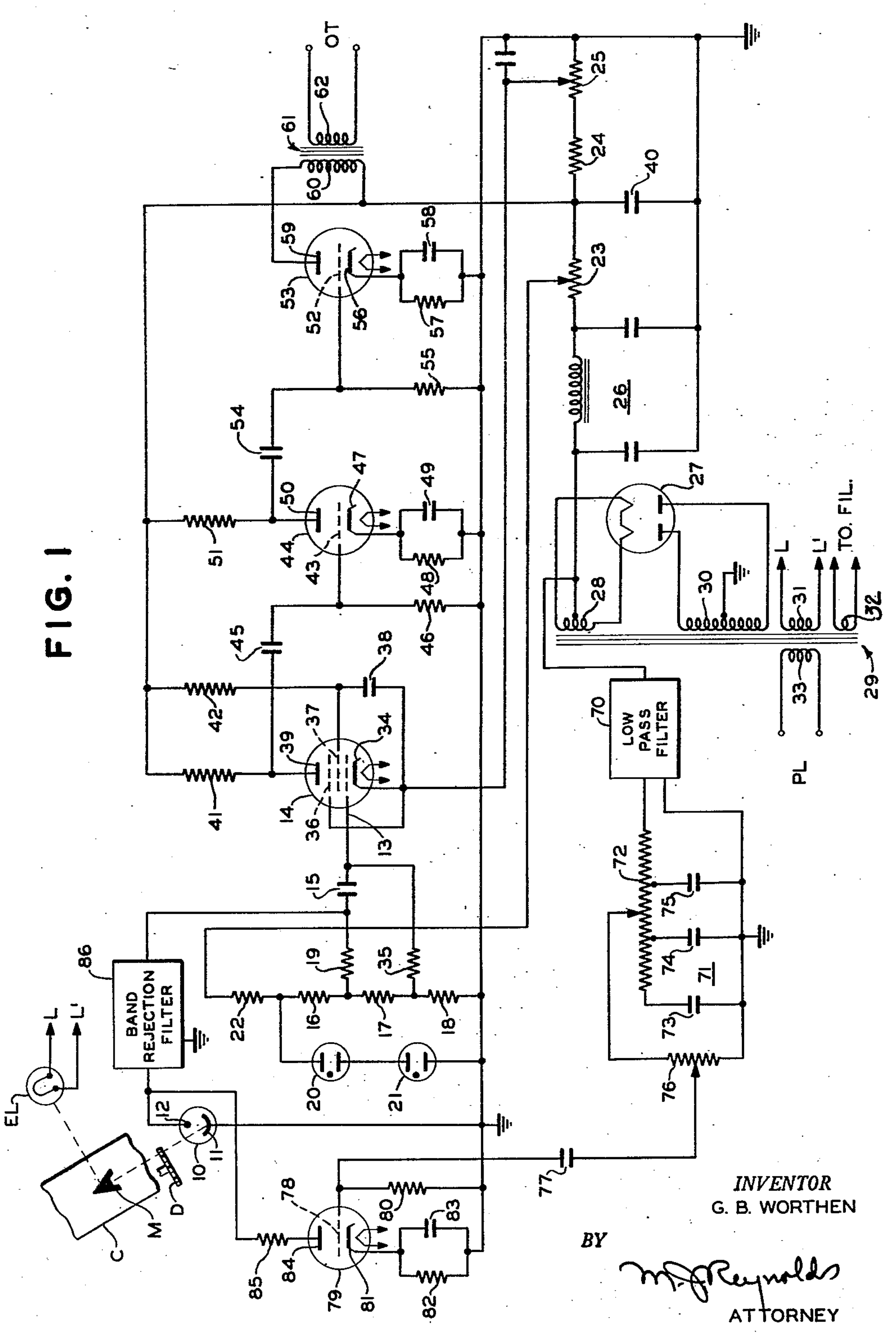

The present invention relates to amplifiers for use with phototubes and more particularly to phototube amplifiers designed to provide substantially constant average output signal levels.

The average output signal level of an amplifier circuit arranged to amplify the output of a phototube will tend to vary materially due to changes in supply voltage and an alternating supply voltage. The most significant cause of this change in average or unmodulated level is the change in illumination provided by the exciter lamp. The change in illumination may be due to variations in the exciter lamp supply voltage and to the presence of alternating components in the supply voltage. The term "average level," as used in the specification and claims refers to the level when the carrier is not modulated with intelligence.

Changes in supply voltage, which may be caused, for instance, by changes in the load coupled to the supply line, generally result in slow changes in average illumination provided by the exciter lamp because such load changes are usually infrequent in character. Where the supply voltage is alternating or has alternating components, the illumination provided by the exciter lamp varies at a rate double that of the alternations, but this rate is generally low with respect to the modulation frequencies so that the resultant phototube output variations may generally be considered as changes in average level.

Changes in supply voltage also tend to affect amplifier average output level by changing tube heater voltages and phototube operating potentials.

In many systems employing phototubes, the average output level must be maintained substantially constant. For instance, in telegraphic communication by facsimile, it is of great importance that the unmodulated carrier level be maintained very constant, preferably within a decibel. In a typical facsimile transmitter employing a gas type phototube, a line voltage change from 100 volts to 130 volts resulted in an unmodulated carrier level change of approximately 12 decibels. Of this 12 decibels, 8.5 decibels may be assigned to exciter lamp illumination change, 2.5 decibels to the phototube, and 1.0 decibel to the amplifier.

The effects of supply voltage variations can be minimized by using a power source having a relatively constant voltage, such as a battery or a regulated power supply. Similarly, the effect of alternating components in the exciter lamp supply can be minimized by using a battery, a well filtered power supply or a high frequency power supply. Such expedients are, however, expensive and bulky and are not well suited for use in a compact and inexpensive facsimile transmitter or transceiver.

Accordingly, it is an object of the invention to provide a phototube amplifier circuit having an average output level substantially independent of supply voltage variations and supply voltage alternations.

More particularly, it is an object of the invention to provide a compact and inexpensive phototube amplifier for use in a facsimile transmitter or transceiver.

Another object of the invention is to provide a facsimile phototube amplifier in which the amplified unmodulated carrier level is substantially independent of supply voltage variations.

Still another object of the invention is to provide a facsimile phototube amplifier in which the amplified unmodulated carrier level is substantially free of amplitude variations produced by alternations of the supply voltage.

Further objects of the invention will appear from the following description.

According to the invention, these objects are achieved by providing a phototube amplifier circuit wherein there is supplied a first regulated voltage for the phototube and an adjustable biasing potential for one or more of the amplifier tubes, the biasing potential being constituted by the difference in potential between a second regulated voltage and a voltage varying with the supply voltage and wherein a modulation of the same frequency as the exciter lamp illumination fluctuations and in phase opposition thereto is employed to cancel the effect of the illumination fluctuations on the amplifier unmodulated or average output level.

Figure 2:
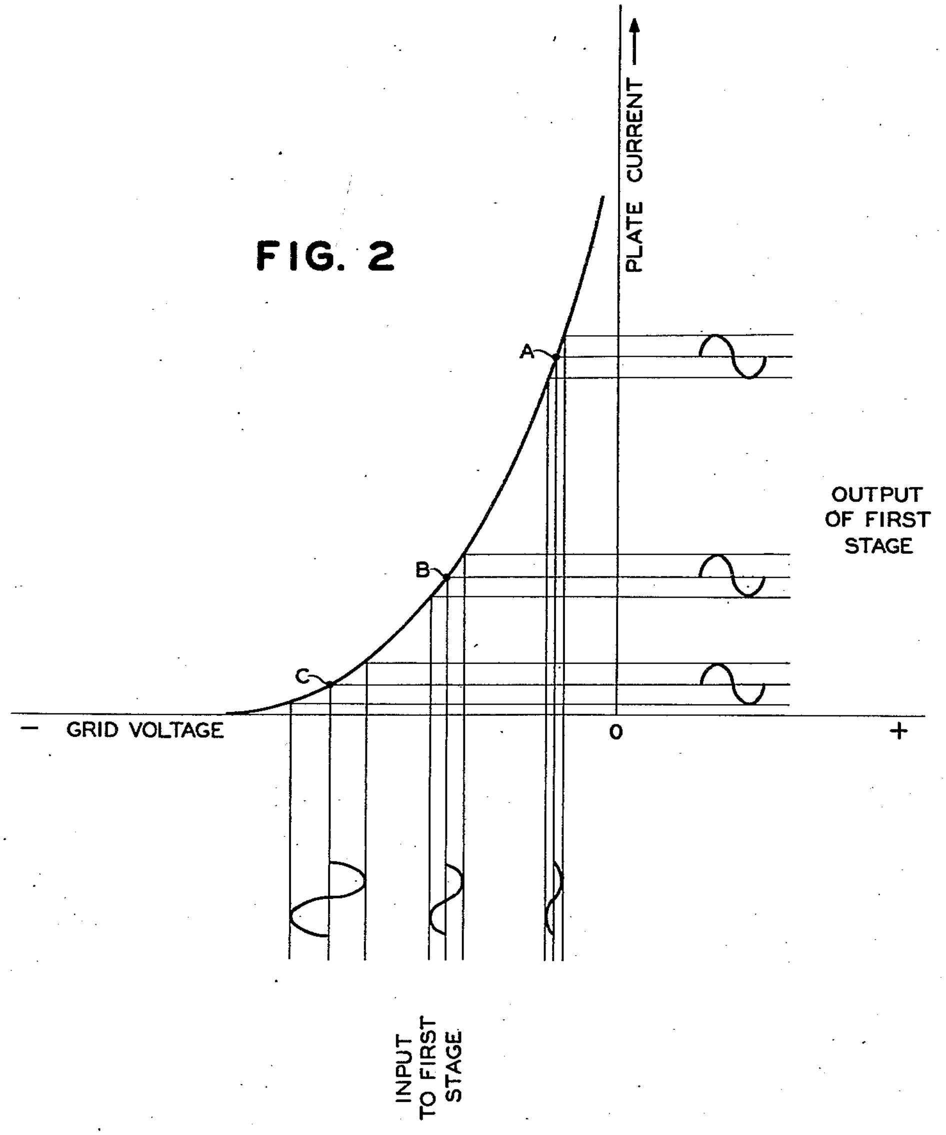

The invention will now be described in greater detail with reference to the appended drawing in which:

Fig. 1 illustrates a facsimile transmitter circuit arrangement in accordance with the invention for providing a substantially constant unmodulated carrier level substantially independent of supply voltage variations in which the effects of alternating current in the supply voltage are substantially eliminated; and Fig. 2 shows an amplifier tube transfer characteristic curve for explaining the operation of the circuit of Fig. 1.

Referring now to the drawing, and more particularly to Fig. 1, there is shown a phototube 10 having a cathode 11 connected to ground and an anode 12 coupled to a control grid 13 of an electron discharge tube 14 through a capacitor 15. A regulated direct operating potential for phototube 10 is derived from a series combination of resistance elements 16, 17 and 18 by coupling anode 12 to the junction of resistors 16 and 17 through a resistor 19. The direct potential across the series combination of resistors 16, 17 and 18, as well as the potential supplied to phototube 10, is maintained substantially constant by shunting the series combination of resistors 16, 17 and 18 with a pair of series connected neon tubes 20 and 21. Other tubes having voltage regulator characteristics could, of course, be used in place of neon tubes. The free terminal of tube 20 is connected to the free end of resistor 16, while the free terminal of tube 21 is connected to the free end of resistor 18 and to ground.

A high positive direct voltage is applied to the free end of resistor 16 through a resistor 22 which is, in turn, coupled to the tapping of a potentiometer 23. Potentiometer 23 forms part of a series load resistance circuit including potentiometer 23, a resistor 24, and a potentiometer 25. The free ends of potentiometers 23 and 25 are connected, respectively, to the high and low potential terminals of a smoothing filter 26. Smoothing filter 26 is, in turn, coupled to the cathodes of a full wave rectifier tube 27 through a secondary winding 28 of a power transformer 29. The anodes of tube 27 are coupled to a high voltage secondary winding 30 of transformer 29. Transformer 29 is also provided with two additional secondary windings 31 and 32 for energizing, respectively, an exciter lamp EL and the tube heater terminals. Exciter lamp EL is arranged to provide illumination for phototube 10. The light from exciter lamp EL is directed onto a copy sheet C having markings M, and is reflected onto cathode 11. A chopper disc D is employed to provide relatively high frequency interruptions of the light impinging on phototube 10. The various secondary windings of transformer 29 are energized from a primary winding 33 coupled to power line PL. Power line PL might be, for instance, a conventional 60 cycle 110–120 volt power main. Power line PL could, of course, be constituted by other sources of alternating power. Furthermore, the invention is equally applicable to sources of direct voltage. Where a direct power voltage is employed, it may be applied directly, or through a voltage divider, to resistors 23, 24 and 25 and to exciter lamp EL.

Cathode 34 of tube 14 is coupled to a tapping of potentiometer 25, thereby applying a relatively low positive potential to the cathode. The value of this positive potential, which constitutes one of the bias voltages for tube 14, will vary with variations in the supply voltage applied to transformer 29. The other bias voltage for tube 14, also a positive voltage, is applied to grid 13 through a resistor 35 connected to the junction of resistors 17 and 18. Due to the regulator action of tubes 20 and 21, this latter bias voltage will remain substantially constant.

A suppressor grid 36 of tube 14 is connected to cathode 34, while a screen grid 37 is coupled to cathode 34 through a decoupling capacitor 38. An anode 39 and screen grid 37 are supplied with positive operating potentials from the junction of potentiometer 23 and resistor 24 through resistors 41 and 42, respectively. The junction of resistor 24 and potentiometer 23 is coupled to ground through a by-pass capacitor 40.

The amplified output of tube 14 is applied to control grid 43 of a second amplifier tube 44 through a capacitor 45. Control grid 43 is coupled to ground through a resistor 46. Cathode 47 of tube 44 is coupled to ground through a biasing resistor 48 and a by-pass capacitor 49. Anode 50 of tube 44 is supplied with a positive operating potential through an anode resistor 51.

The output of tube 44 is applied to control grid 52 of a third amplifier tube 53 through a coupling capacitor 54. Control grid 52 is connected to ground through a resistor 55. Cathode 56 of tube 53 is coupled to ground through a biasing resistor 57 and a by-pass capacitor 58. Positive operating potential for anode 59 of tube 53 is applied thereto through a primary winding 60 of an output transformer 61. The amplifier output signal is derived from terminals OT coupled to a secondary winding 62 of transformer 61.

The grid bias of tube 14, which is equal to the difference between the regulated positive voltage applied to grid 13 and the unregulated voltage applied to cathode 34, is selected to provide the desired tube operating point at normal power line voltage. If the power line voltage increases, the voltage applied to cathode 34 will rise accordingly, thereby increasing the effective negative grid bias of tube 14.

Such an increase in power line voltage will be accompanied by an increase in the illumination supplied by exciter lamp EL, so that the average output level of phototube 10 will increase. If the increase in negative bias applied to tube 14 reduces the gain thereof by the proper amount, the decrease in gain will compensate for the increase in average phototube output, so that the average signal level at terminals OT will remain substantially unchanged. A decrease in power line voltage will result in a decrease in exciter lamp illumination and phototube average output and also in a decrease in negative bias of tube 14 and increase in gain thereof, thereby compensating for the decrease in average phototube output.

In order properly to compensate for line voltage variations over a given range, it is necessary properly to choose the normal operating point of tube 14. First, it is necessary to choose an operating point at which tube gain will vary appreciably with bias. For a remote cut-off tube, such as, for instance, the type 6SK7, the bias range over which such gain control is possible is relatively large. With a sharp cut-off tube, such as, for instance, the type 6SJ7, the bias range over which such gain control is possible is limited to the relatively small bias range in which the tube characteristic has substantial curvature.

Referring to Fig. 2, which is a plot of plate current versus grid voltage, the curve shown may be considered as the non-linear portion of a transfer characteristic of either a sharp or remote cut-off tube. Assuming, for purposes of illustration only, that the power line voltage is normally 115 volts and that it may vary between 100 volts and 130 volts, points A, B and C correspond, respectively, to the effective bias potentials applied to tube 14 for the line voltages 100, 115 and 130 volts. The signal voltage applied to grid 13 will have relatively low, medium and high values corresponding, respectively, to line voltages of 100, 115 and 130 volts because of the effect of line voltage on exciter lamp brilliance.

If point B, which is the operating point for normal line voltage, is properly chosen, the output voltages corresponding to points A, B and C, respectively, will each have substantially the same values because of the curvature of the tube characteristic. Intermediate points corresponding to intermediate line voltages, which may not be as closely compensated, will nevertheless yield substantially constant output voltages.

When using a sharp cut-off tube, only small signal voltages may be amplified without distortion when the tube is operated in this non-linear range. However, in facsimile circuits, as wall as in most phototube applications, the signal voltage to be amplified is relatively small.

It is important that grid 13 be returned to a regulated positive voltage and not to ground potential. The reason for this can be seen from the following example, given by way of illustration. Assume that a change in bias of 2.5 volts is required to change the tube gain by 4 decibels and that a line voltage change of ±10% required such a change in gain for compensation. Assume also that changes in unregulated (cathode) voltage are proportional to changes in line voltage. A ten percent change in the unregulated voltage would have to correspond to a change in grid bias of 2.5 volts. The normal unregulated voltage VI therefore would be $$0.1\ VI=2.5$$
$$VI=25$$

A 25 volt positive potential on the cathode would result in the tube's being cut-off at all times. However, if a fixed positive potential of proper value is applied to the grid, the tube will not be cut off. Even if tube 14 were not cut off by the bias developed, the gain thereof would have an inordinately low value. In the example assumed, a regulated potential on the grid of 21 volts would cause the net bias, for a cathode voltage of 25 volts, to be −4 volts, a more practical value. The actual regulation characteristic for a given tube will depend upon the voltages and circuit parameters selected.

The illumination provided by exciter lamp EL will vary at a rate determined by the frequency of the voltage supplied from power line PL. Assuming a 60 cycle supply, the current supplied to exciter lamp EL will traverse a positive and a negative set of values during each cycle. Since the exciter lamp presents an impedance substantially resistive in character and since it will light on both positive and negative half cycles, the illumination will vary at a rate equal to twice the supply frequency, or 120 cycles per second. Since the filament of the exciter lamp has considerable thermal inertia, the maximum and minimum light intensities will not occur simultaneously with the maximum and minimum voltage values, respectively. Thus there is a time or phase lag between voltge and light alternations. The actual amplitude of the light intensity variations will not be very great because the supply frequency is sufficiently high to prevent complete extinguishment of the lamp.

However, the light variations actually produced will generally be sufficient to produce parallel bars varying harmonically in density on the recording copy sheet. These bars, which actually appear as variations in background level, are produced because phototube 10 is unable to distinguish between variations in exciter light and variations in density of the transmitted copy. The light variations may be considered as producing modulation of the facsimile carrier at double power line frequency. If a chopper producing a 5000 cycle carrier is employed, the 5000 cycle carrier would be modulated with a 120 cycle signal for a power line frequency of 60 cycles.

In accordance with the invention, this modulation component is suppressed by combining it with a modulation component of equal amplitude but in phase opposition thereto. For this purpose, a low-pass filter 70 is coupled to the center tap of secondary winding 28 to provide a voltage at double power line frequency. Assuming a 60 cycle supply, low pass filter 70 should pass 120 cycles and suppress all other harmonics in the output of rectifier 27. The full wave rectification provided by tube 27 will result in a predominant ripple frequency of 120 cycles. Filter 70 could also be realized as a band pass filter designed to accept 120 cycles. The output of filter 70 is applied to a phase shifting network 71 comprising a potentiometer 72 and capacitors 73, 74 and 75. The phase of the voltage applied to network 71 may be varied through substantially 180° by adjusting the tapping of potentiometer 72. The tapping of potentiometer 72 is coupled to a potentiometer 76, the tapping of which is coupled through a capacitor 77 to a control grid 78 of a modulator tube 79. Control grid 78 is also coupled to ground through a resistor 80. Cathode 81 is coupled to ground through a biasing resistor 82 and a by-pass capacitor 83. Anode 84 is coupled to anode 12 of phototube 10 through a resistor 85.

The phase and amplitude of the voltage from filter 70 are adjusted by means of the tappings on potentiometers 72 and 76, respectively, so as to produce a modulation component equal in amplitude and in phase opposition to the modulation component produced by the illumination fluctuations of lamp EL. The two modulation components therefore substantially cancel out. A band rejection filter 86 is interposed between phototube 10 and tube 14 to suppress any unmodulated 120 cycle ripple present because of the use of a single ended modulator.

It is seen that by using this circuit, the output signal developed at terminals OT will have a substantially constant average value without a power supply component. In a facsimile system, this corresponds to a substantially constant background or spacing level.

While the invention has been described in a particular use thereof and in particular embodiments, it is not desired that it be limited thereto, for obvious modifications thereof will occur to those skilled in the art without departing from the spirit and scope of the invention as set forth in the appended claims.

What is claimed is:

1. A transducer circuit arrangement for converting modulating variations in intensity of illumination from an exciter lamp into a modulated signal voltage having an unmodulated carrier amplitude substantially independent of variations in supply voltage to said exciter lamp, comprising an exciter lamp having a variable voltage supply for producing a variable source of illumination, a phototube disposed in the path of said illumination and having an output voltage responsive to variations thereof, an electron discharge tube having cathode and control grid electrodes and having an anode, means to apply said output voltage to said control grid electrode, a source of a first substantially constant biasing potential having a given polarity, means to apply said first biasing potential to said control grid electrode, a source of a second biasing potential having said given polarity, means whereby the second biasing potential varies continuously and uninterruptedly in proportion to variations in magnitude of said voltage supply, means to apply said second biasing potential to said cathode electrode thereby to vary the gain of said discharge tube in a sense opposite to the magnitude variations of said supply voltage, and means coupled to the anode of said discharge tube to derive therefrom a modulated signal voltage having a value proportional to said modulating variations and substantially independent of variations in supply voltage to said exciter lamp.

2. A transducer circuit arrangement for converting modulating variations in intensity of illumination from an exciter lamp into a modulated signal voltage having an unmodulated carrier amplitude substantially independent of variations in supply voltage to said exciter lamp, comprising an exciter lamp having a variable voltage supply for producing a variable source of illumination, a phototube disposed in the path of said illumination and having an output voltage responsive to variations thereof, an electron discharge tube having cathode, control grid and anode electrodes and having a transfer characteristic with a non-linear portion, means to apply said output voltage to said control grid electrode, a source of a first substantially constant positive biasing potential, means to apply said first biasing potential to said control grid electrode, a source of a second positive biasing potential, means whereby the second biasing potential varies continuously and uninterruptedly in proportion to variations in magnitude of said voltage supply, said second biasing potential having a value greater than said first biasing potential thereby to produce operation of said tube about a point within said non-linear portion of said transfer characteristic, means to apply said second positive biasing potential to said cathode electrode thereby to vary the gain of said discharge tube in a sense opposite to the magnitude variations of said supply voltage, and means coupled to the anode of said discharge tube to derive therefrom a modulated signal voltage having a value proportional to said modulating variations and substantially independent of variations in supply voltage to said exciter lamp.

3. A transducer circuit arrangement for converting modulating variations in intensity of illumination from an exciter lamp into a modulated signal voltage having an unmodulated carrier amplitude substantially independent of variations in supply voltage to said exciter lamp, comprising an exciter lamp having a variable voltage supply for producing a variable source of illumination, a phototube disposed in the path of said illumination and having an output voltage responsive to variations thereof, an electron discharge tube having cathode, control grid and anode electrodes, means to apply said output voltage to said control grid electrode, a source of a first substantially constant positive potential, means to apply a first portion of said first potential to said phototube as an operating potential therefor, means to apply a second portion of said first potential to said control grid electrode as a first biasing potential therefor, a source of a second positive biasing potential, means whereby the second biasing potential varies continuously and uninterruptedly in proportion to variations in magnitude of said voltage supply, means to apply said second positive biasing potential to said cathode electrode thereby to vary the gain of said discharge tube in a sense opposite to the magnitude variations of said supply voltage, and means coupled to the anode of said discharge tube to derive therefrom a modulated signal voltage having a value proportional to said modulating variations and substantially independent of variations in supply voltage to said exciter lamp.

4. In a facsimile transmitter comprising an exciter lamp having a voltage supply for producing a variable source of illumination, a copy sheet having markings thereon and arranged to direct the light from said lamp in a given path and a phototube for converting variations in intensity of said light into a modulated facsimile signal and arranged in said path, a compensated amplifier comprising an electron discharge tube having cathode, control grid and anode electrodes, means to apply said facsimile signal to said control grid, a source of a first substantially constant biasing potential having a given polarity, means to apply said first biasing potential to said control grid, a source of a second biasing potential having said given polarity, means whereby the second biasing potential varies continuously and uninterruptedly in proportion to variations in magnitude of said voltage supply, means to apply said second biasing potential to said cathode thereby to vary the gain of said discharge tube in a sense opposite to variations in magnitude of the supply voltage to said exciter lamp, and means to derive from said anode an amplified facsimile signal having a background level substantially independent of variations in magnitude of the supply voltage to said exciter lamp.

5. In a facsimile transmitter comprising an exciter lamp having a voltage supply for producing a variable source of illumination, a copy sheet having markings thereon and arranged to direct the light from said lamp into a given path and a phototube for converting variations in intensity of said light into a modulated facsimile signal and arranged in said path, a compensated multistage cascade amplifier, the first stage of said amplifier comprising an electron discharge tube having cathode, control grid and anode electrodes, means to apply said facsimile signal to said control grid, a source of a first substantially constant positive potential, means to apply a first portion of said first positive potential to said phototube as an operating potential therefor, means to apply a second portion of said first potential to said control grid as a first biasing potential therefor, a source of a second positive biasing potential, means whereby the second biasing potential varies continuously and uninterruptedly in proportion to variations in magnitude of said voltage supply, means to apply said second biasing potential to said cathode thereby to vary the gain of said discharge tube in a sense opposite to variations in magnitude of the supply voltage to said exciter lamp, and means to derive from said amplifier an amplified facsimile signal having a background level substantially independent of variations in magnitude of the supply voltage to said exciter lamp.

6. A transducer circuit arrangement, comprising an exciter lamp, a variable source of supply voltage for said exciter lamp, said supply voltage having an alternating component producing a first modulation component in the light from said exciter lamp, a phototube disposed in the path of light from said lamp, means interposed in the path between said lamp and said phototube to vary the intensity of illumination impinging on said phototube to thereby produce a second modulation component in the light from said lamp impinging on said phototube, means to derive from said phototube a modulated signal voltage having first and second signal modulation components proportional, respectively, to said first and second modulation components, an amplifier electron discharge tube having cathode, control grid and anode electrodes, means to apply said signal voltage to said control grid, a source of a first substantially constant biasing potential having a given polarity, means to apply said first biasing potential to said control grid, a source of a second biasing potential having said given polarity and having a magnitude proportional to the magnitude of the supply voltage for said exciter lamp, means to apply said second biasing potential to said cathode thereby to vary the gain of said amplifier tube in a sense opposite to magnitude variations of the supply voltage for said exciter lamp, means to derive from said supply voltage a compensating voltage equal in magnitude and in phase opposition to said first signal modulation component, means to modulate said compensating voltage on said signal voltage thereby to suppress said first signal modulation component, and means coupled to the anode of said discharge tube to derive therefrom an amplified modulated signal voltage having a value proportional to said second modulation component and substantially independent of magnitude variations and alternating components of the supply voltage for said exciter lamp.

7. A transducer circuit arrangement, comprising an exciter lamp, a variable source of supply voltage for said exciter lamp, said supply voltage having an alternating component producing a first modulation component in the light from said exciter lamp, a phototube disposed in the path of light from said lamp, means interposed in the path between said lamp and said phototube to vary the intensity of illumination impinging on said phototube to thereby produce a second modulation component in the light from said lamp impinging on said phototube, means to derive from said phototube a modulated signal voltage having first and second signal modulation components proportional, respectively, to said first and second modulation components, an amplifier electron discharge tube having cathode, control grid and anode electrodes, means to apply said signal voltage to said control grid, a source of a first substantially constant positive biasing potential, means to apply said first biasing potential to said control grid, a source of a second positive biasing potential having a magnitude proportional to the magnitude of the supply voltage for said exciter lamp, means to apply said second biasing potential to said cathode thereby to vary the gain of said amplifier tube in a sense opposite to magnitude variations of the supply voltage for said exciter lamp, means to derive from said supply voltage a compensating voltage equal in magnitude and in phase opposition to said first signal modulation component, means to modulate said compensating voltage on said signal voltage thereby to suppress said first signal modulation component, and means coupled to the anode of said discharge tube to derive therefrom an amplified modulated signal voltage having a value proportional to said second modulation component and substantially independent of magnitude variations and alternating components of the supply voltage for said exciter lamp.

8. A transducer circuit arrangement, comprising an exciter lamp, a variable source of alternating supply voltage for said exciter lamp, the alternations of said supply voltage producing a first modulation component in the light from said exciter lamp, a phototube disposed in the path of light from said lamp, means interposed in the path between said lamp and said phototube to vary the intensity of illumination impinging on said phototube to thereby produce a second modulation component in the light from said lamp impinging on said phototube, means to derive from said phototube a modulated signal voltage having first and second signal modulation components proportional, respectively, to said first and second modulation components, an amplifier electron discharge tube having cathode, control grid and anode electrodes, means to apply said signal voltage to said control grid, a source of a first substantially constant positive biasing potential, means to apply said first biasing potential to said control grid, a source of a second positive biasing potential having a magnitude proportional to the magnitude of the supply voltage for said exciter lamp, means to apply said second biasing potential to said cathode thereby to vary the gain of said amplifier tube in a sense opposite to magnitude variations of the supply voltage for said exciter lamp, means including a phase shifting network to derive from said supply voltage a compensating voltage equal in magnitude and in phase opposition to said first signal modulation component, means to modulate said compensating voltage on said signal voltage thereby to suppress said first signal modulation component, and means coupled to the anode of said discharge tube to derive therefrom an amplified modulated signal voltage having a value proportional to said second modulation component and substantially independent of magnitude variations and alternations of the supply voltage for said exciter lamp.

9. A transducer circuit arrangement, comprising an exciter lamp, a variable source of supply voltage for said exciter lamp, said supply voltage having an alternating component producing a first modulation component in the light from said exciter lamp, a phototube disposed in the path of light from said lamp, means comprising a facsimile copy sheet interposed in the path between said lamp and said phototube to vary the intensity of illumination impinging on said phototube to thereby produce a second modulation component in the light from said lamp impinging on said phototube, means to derive from said phototube a modulated signal voltage having first and second signal modulation components proportional, respectively, to said first and second modulation components, an amplifier electron discharge tube having cathode, control grid and anode electrodes, means to apply said signal voltage to said control grid, means to derive from said supply voltage a first substantially constant positive biasing potential, means to apply said first biasing potential to said control grid, means to derive from said supply voltage a second positive biasing potential having a magnitude proportional to the magnitude of the supply voltage for said exciter lamp, means to apply said second biasing potential to said cathode thereby to vary the gain of said amplifier tube in a sense opposite to magnitude variations of the supply voltage for said exciter lamp, means to derive from said supply voltage a compensating voltage equal in magnitude and in phase opposition to said first signal modulation component, means to modulate said compensating voltage on said signal voltage thereby to suppress said first signal modulation component, and means coupled to the anode of said discharge tube to derive therefrom an amplified modulated signal voltage having a value proportional to said second modulation component and substantially independent of magnitude variations and alternating components of the supply voltage for said exciter lamp.

References Cited in the file of this patent

UNITED STATES PATENTS

| | | |
|---|---|---|
| 2,228,560 | Cox | Jan. 14, 1941 |
| 2,236,172 | Gray | Mar. 25, 1941 |
| 2,336,673 | Cooley | Dec. 14, 1943 |
| 2,420,058 | Sweet | May 6, 1947 |